US012688244B2

(12) United States Patent　　　(10) Patent No.:　US 12,688,244 B2
Coutinho　　　　　　　　　　　　(45) Date of Patent:　　Jul. 21, 2026

(54) SYSTEM AND METHOD FOR USING GRAPH THEORY TO RANK CHARACTERISTICS

(71) Applicant: ADP, Inc., Roseland, NJ (US)

(72) Inventor: Roberto Coutinho, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/629,716

(22) Filed: Apr. 8, 2024

(65) Prior Publication Data

US 2024/0346095 A1　　　Oct. 17, 2024

Related U.S. Application Data

(63) Continuation of application No. 17/454,182, filed on Nov. 9, 2021, now Pat. No. 11,954,159.

(51) Int. Cl.
　　*G06F 16/953*　　　(2019.01)
　　*G06F 16/901*　　　(2019.01)
(52) U.S. Cl.
　　CPC ........ G06F 16/953 (2019.01); G06F 16/9024 (2019.01)
(58) Field of Classification Search
　　CPC ........................... G06F 16/953; G06F 16/9024
　　See application file for complete search history.

(56) References Cited

U.S. PATENT DOCUMENTS

| | | | | | |
|---|---|---|---|---|---|
| 8,046,307 | B2 * | 10/2011 | Habichler | .............. | G06Q 10/00 705/320 |
| 8,407,253 | B2 * | 3/2013 | Ryu | .................... | G06F 16/9024 707/790 |

| | | | | | |
|---|---|---|---|---|---|
| 8,539,359 | B2 * | 9/2013 | Rapaport | ............... | G06Q 30/02 715/767 |
| 9,117,180 | B1 * | 8/2015 | Chiu | ....................... | G06N 20/00 |
| 9,436,760 | B1 * | 9/2016 | Tacchi | ............... | G06F 16/9024 |
| 9,710,544 | B1 * | 7/2017 | Smith | ...................... | G06F 40/30 |
| 9,787,705 | B1 * | 10/2017 | Love | ................... | G06F 16/9024 |
| 9,836,183 | B1 * | 12/2017 | Love | ..................... | G06F 16/904 |
| 9,911,211 | B1 * | 3/2018 | Damaraju | ............... | G06T 11/26 |
| 10,152,695 | B1 * | 12/2018 | Chiu | ................. | G06Q 10/1053 |
| 10,262,082 | B2 * | 4/2019 | Rodriguez | ........... | G06F 16/904 |
| 10,528,916 | B1 * | 1/2020 | Taylor | ...................... | G06N 5/01 |
| 10,936,985 | B2 * | 3/2021 | Portnoy | .............. | G06Q 10/105 |

(Continued)

FOREIGN PATENT DOCUMENTS

| | | | | | |
|---|---|---|---|---|---|
| CA | | 2726573 | A1 * | 6/2011 | ......... G06Q 10/1053 |

OTHER PUBLICATIONS

International Search Report and Written Opinion issued in corresponding International Application No. PCT/US2022/079526, dated Jan. 23, 2023 (9 pages).

(Continued)

*Primary Examiner* — Mark E Hershley

(74) *Attorney, Agent, or Firm* — Foley & Lardner LLP

(57) ABSTRACT

Systems, methods, and computer-readable storage media for building knowledge graphs which map the aspects of entities, then transforming the graphs into vectors for a similarity comparison. The resulting vectors can be used to identify skills and competencies of individuals, which the system uses to compare those individuals to others. The system can then quantify who would make for a good replacement for a given individual and make an associated recommendation.

20 Claims, 4 Drawing Sheets

(56) References Cited

U.S. PATENT DOCUMENTS

| | | | |
|---|---|---|---|
| 11,023,611 B2 * | 6/2021 | Tung | G06F 21/6245 |
| 11,106,979 B2 * | 8/2021 | Ramanath | G06F 16/9024 |
| 11,157,877 B1 * | 10/2021 | Bue | G06Q 10/1053 |
| 11,211,149 B2 * | 12/2021 | Curtis | G16B 10/00 |
| 11,264,140 B1 * | 3/2022 | Tal | G16H 50/20 |
| 11,487,791 B2 * | 11/2022 | Walker | G06F 16/288 |
| 11,562,328 B1 * | 1/2023 | Jiang | G06N 3/08 |
| 11,593,622 B1 * | 2/2023 | Gandhi | G06N 3/0464 |
| 12,306,842 B1 * | 5/2025 | Yates | G06F 16/24578 |
| 2006/0112146 A1 * | 5/2006 | Song | G06Q 10/10 |
| 2007/0208572 A1 * | 9/2007 | Habichler | G06Q 10/063112 |
| | | | 705/320 |
| 2007/0231777 A1 * | 10/2007 | Dimarco | G09B 19/00 |
| | | | 434/219 |
| 2009/0030927 A1 * | 1/2009 | Cases | G06Q 30/02 |
| | | | 707/999.102 |
| 2009/0106105 A1 * | 4/2009 | Lewis | G06Q 30/0273 |
| | | | 705/14.69 |
| 2011/0238591 A1 * | 9/2011 | Kerr | G06Q 10/1053 |
| | | | 705/321 |
| 2013/0053086 A1 * | 2/2013 | Akitomi | G06Q 10/0639 |
| | | | 455/517 |
| 2013/0110733 A1 * | 5/2013 | Mohanty | G06Q 10/1053 |
| | | | 705/320 |
| 2013/0178956 A1 * | 7/2013 | Vashist | G06Q 10/105 |
| | | | 700/91 |
| 2014/0114987 A1 * | 4/2014 | Hoeng | G06N 7/06 |
| | | | 707/748 |
| 2014/0129457 A1 * | 5/2014 | Peeler | G06Q 30/018 |
| | | | 705/317 |
| 2014/0282586 A1 * | 9/2014 | Shear | G06F 9/5072 |
| | | | 718/104 |
| 2014/0358607 A1 * | 12/2014 | Gupta | G06Q 10/063112 |
| | | | 705/7.14 |
| 2015/0046356 A1 * | 2/2015 | Millmore | G06Q 10/1053 |
| | | | 705/321 |
| 2015/0095105 A1 * | 4/2015 | Fitts | G06Q 30/0201 |
| | | | 705/7.29 |
| 2015/0302335 A1 * | 10/2015 | Unda | G06Q 10/06393 |
| | | | 705/7.39 |
| 2015/0317605 A1 * | 11/2015 | Rao | G06Q 10/1053 |
| | | | 705/321 |
| 2016/0041982 A1 * | 2/2016 | He | G06F 16/24578 |
| | | | 707/728 |
| 2016/0112365 A1 * | 4/2016 | Blue | G06F 16/9535 |
| | | | 709/204 |
| 2016/0188566 A1 * | 6/2016 | Jifroodian-Haghighi | |
| | | | G09B 5/02 |
| | | | 704/10 |
| 2016/0189034 A1 * | 6/2016 | Shakeri | G09B 5/00 |
| | | | 706/47 |
| 2016/0196534 A1 * | 7/2016 | Jarrett | G06Q 50/2057 |
| | | | 705/321 |
| 2016/0267436 A1 * | 9/2016 | Silber | G06Q 10/1053 |
| 2016/0378882 A1 * | 12/2016 | Rodriguez | G06F 16/904 |
| | | | 707/737 |
| 2017/0017914 A1 * | 1/2017 | Gupta | G06Q 10/1053 |
| 2017/0032298 A1 * | 2/2017 | de Ghellinck | G06Q 10/0639 |
| 2017/0154307 A1 * | 6/2017 | Maurya | G06Q 10/1053 |
| 2017/0213127 A1 * | 7/2017 | Duncan | G16B 50/30 |
| 2017/0236081 A1 * | 8/2017 | Grady Smith | G06Q 10/0637 |
| | | | 705/7.36 |
| 2017/0242909 A1 * | 8/2017 | Kenthapadi | G06F 16/287 |
| 2017/0262783 A1 * | 9/2017 | Franceschini | G06Q 10/063112 |
| 2017/0300547 A1 * | 10/2017 | Jose | G06F 16/27 |
| 2017/0316380 A1 * | 11/2017 | Swaminathan | G06Q 10/105 |
| 2017/0365022 A1 * | 12/2017 | Corcoran | G06Q 10/067 |
| 2018/0060822 A1 * | 3/2018 | Hou | G06Q 10/1053 |
| 2018/0075018 A1 * | 3/2018 | Avkd | G06Q 10/1053 |
| 2018/0096306 A1 * | 4/2018 | Wang | G06Q 10/1053 |
| 2018/0218330 A1 * | 8/2018 | Kadambala | G06Q 10/1053 |
| 2018/0232751 A1 * | 8/2018 | Terhark | G06Q 10/063118 |
| 2018/0253694 A1 * | 9/2018 | Kenthapadi | G06Q 10/1053 |
| 2018/0253695 A1 * | 9/2018 | Kenthapadi | G06Q 10/1053 |
| 2018/0253989 A1 * | 9/2018 | Gerace | G09B 5/14 |
| 2018/0316704 A1 * | 11/2018 | Joseph Durairaj | H04L 41/142 |
| 2018/0330303 A1 * | 11/2018 | Mosley | G06Q 10/06398 |
| 2018/0330331 A1 * | 11/2018 | Nair | G06Q 10/1053 |
| 2018/0336525 A1 * | 11/2018 | Kenthapadi | G06Q 10/1053 |
| 2018/0336527 A1 * | 11/2018 | Kenthapadi | H04L 67/75 |
| 2019/0066029 A1 * | 2/2019 | Hancock | G06N 5/04 |
| 2019/0066054 A1 * | 2/2019 | Kenthapadi | G06Q 10/1053 |
| 2019/0073580 A1 * | 3/2019 | Dzhulgakov | G06N 3/0495 |
| 2019/0095869 A1 * | 3/2019 | Zhang | G06Q 10/1053 |
| 2019/0130361 A1 * | 5/2019 | Hazarika | G06Q 10/063112 |
| 2019/0155961 A1 * | 5/2019 | Alonso | G06F 16/951 |
| 2019/0188645 A1 * | 6/2019 | Monasor | G06Q 10/1053 |
| 2019/0197487 A1 * | 6/2019 | Jersin | G06Q 10/1053 |
| 2019/0266497 A1 * | 8/2019 | Yuan | G06N 5/025 |
| 2019/0286721 A1 * | 9/2019 | Sharma | G06F 16/24 |
| 2019/0286751 A1 * | 9/2019 | Ram | G09B 5/06 |
| 2019/0325395 A1 * | 10/2019 | Kurjanowicz | G06Q 10/063 |
| 2019/0361890 A1 * | 11/2019 | Rogynskyy | G06Q 10/107 |
| 2020/0051178 A1 * | 2/2020 | Albouyeh | G06Q 10/40 |
| 2020/0126022 A1 * | 4/2020 | Gaspar | G06Q 10/1053 |
| 2020/0134568 A1 * | 4/2020 | Karri | G06Q 10/1053 |
| 2020/0143383 A1 * | 5/2020 | Copeland | G06F 16/9024 |
| 2020/0233864 A1 * | 7/2020 | Jin | G06F 16/288 |
| 2020/0279190 A1 * | 9/2020 | Kitajima | G06N 20/00 |
| 2020/0311683 A1 * | 10/2020 | Chua | G06F 18/22 |
| 2020/0349521 A1 * | 11/2020 | Clark | G06Q 10/1053 |
| 2020/0358796 A1 * | 11/2020 | Kundu | G06N 3/045 |
| 2020/0379958 A1 * | 12/2020 | Riggs | G06F 16/2358 |
| 2020/0387819 A1 * | 12/2020 | Rogynskyy | G06N 20/00 |
| 2020/0394551 A1 * | 12/2020 | Rao | G06N 5/04 |
| 2021/0019325 A1 * | 1/2021 | Edge | G06F 16/9024 |
| 2021/0019558 A1 * | 1/2021 | Edge | G06F 18/2323 |
| 2021/0056428 A1 * | 2/2021 | Palowitch | G06F 17/10 |
| 2021/0073287 A1 * | 3/2021 | Hunter | H04L 63/123 |
| 2021/0142293 A1 * | 5/2021 | Kenthapadi | G06F 16/212 |
| 2021/0279220 A1 * | 9/2021 | Subramaniam | G06F 16/28 |
| 2021/0294797 A1 * | 9/2021 | Gupta | G06F 21/6254 |
| 2021/0357458 A1 * | 11/2021 | Wu | G06F 16/9038 |
| 2022/0092028 A1 * | 3/2022 | Layton | G06F 16/164 |
| 2022/0138826 A1 * | 5/2022 | Wang | G06F 16/9538 |
| | | | 705/26.63 |
| 2022/0253722 A1 * | 8/2022 | Wu | G06Q 30/0631 |
| 2022/0406208 A1 * | 12/2022 | Ram | G09B 5/04 |
| 2023/0044863 A1 * | 2/2023 | Tople | G09B 7/06 |
| 2023/0049817 A1 * | 2/2023 | Shi | G06N 3/08 |
| 2023/0126032 A1 * | 4/2023 | Swerdlow | H04M 3/543 |
| | | | 455/413 |
| 2023/0145199 A1 * | 5/2023 | Coutinho | G06Q 30/0201 |
| | | | 707/749 |
| 2023/0351215 A1 * | 11/2023 | Sun | G06N 3/08 |

OTHER PUBLICATIONS

US Office Action issued in corresponding U.S. Appl. No. 17/454,182, dated Jun. 8, 2023 (17 pages).

Notice of Allowance issued in corresponding U.S. Appl. No. 17/454,182, dated Dec. 13, 2023 (14 pages).

Extended European Search Report issued in corresponding EP Patent Application No. 22893796.7, dated Aug. 13, 2025 (10 pages).

* cited by examiner

Figures 1, 2:
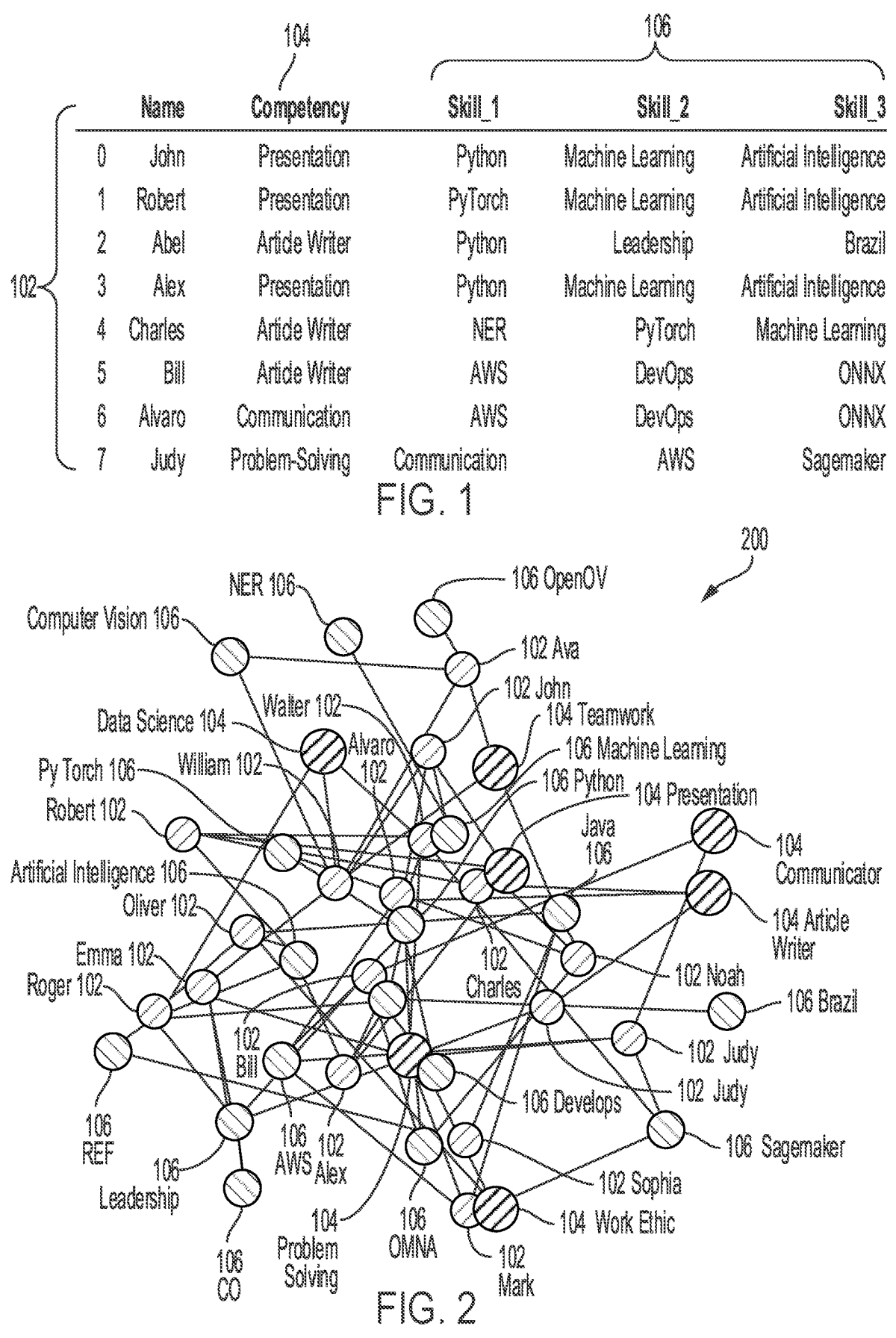

|  | Name | Competency | Skill_1 | Skill_2 | Skill_3 |
|---|---|---|---|---|---|
| 0 | John | Presentation | Python | Machine Learning | Artificial Intelligence |
| 1 | Robert | Presentation | PyTorch | Machine Learning | Artificial Intelligence |
| 2 | Abel | Article Writer | Python | Leadership | Brazil |
| 3 | Alex | Presentation | Python | Machine Learning | Artificial Intelligence |
| 4 | Charles | Article Writer | NER | PyTorch | Machine Learning |
| 5 | Bill | Article Writer | AWS | DevOps | ONNX |
| 6 | Alvaro | Communication | AWS | DevOps | ONNX |
| 7 | Judy | Problem-Solving | Communication | AWS | Sagemaker |

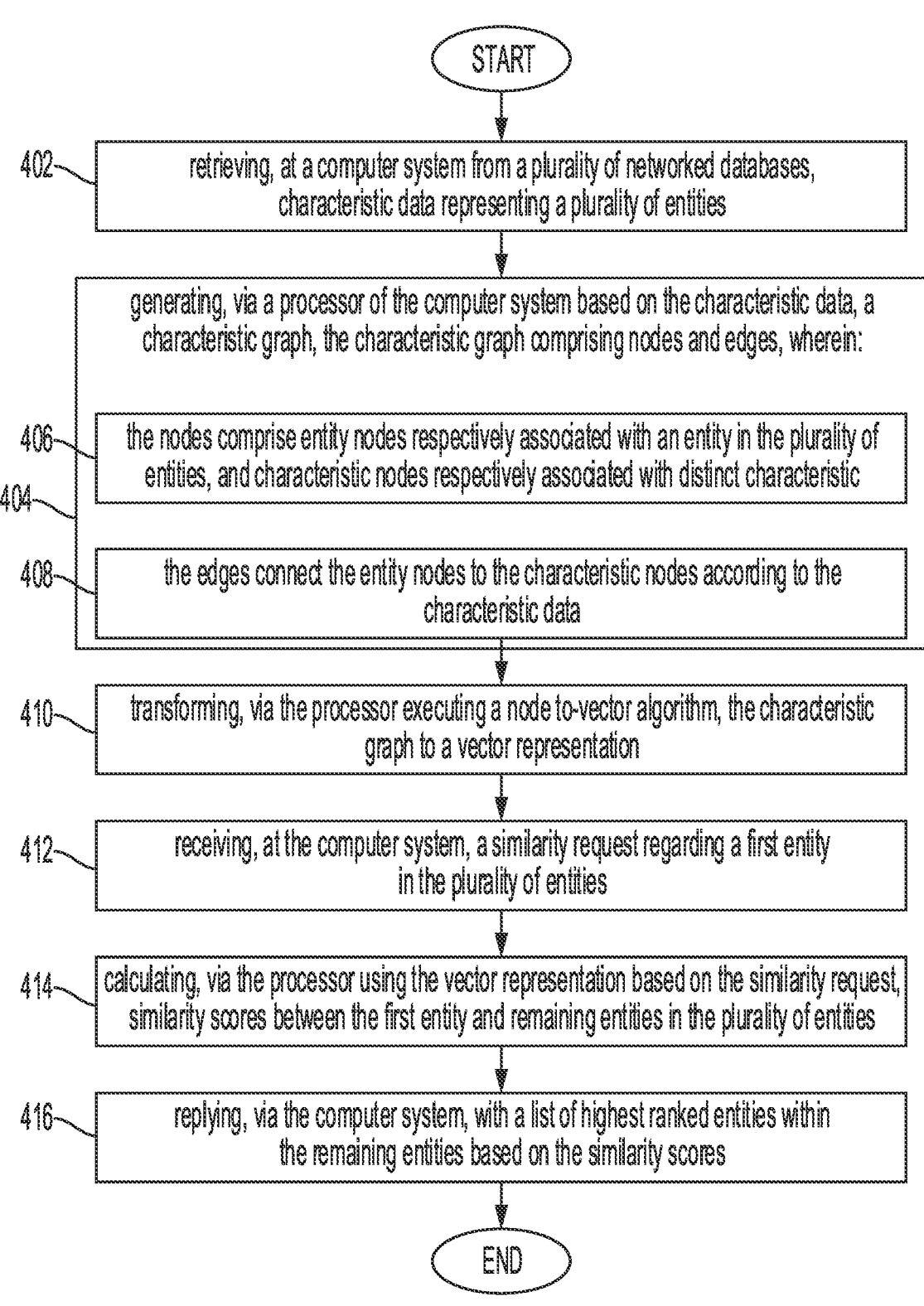

START

402 — retrieving, at a computer system from a plurality of networked databases, characteristic data representing a plurality of entities generating, via a processor of the computer system based on the characteristic data, a characteristic graph, the characteristic graph comprising nodes and edges, wherein:

406 — the nodes comprise entity nodes respectively associated with an entity in the plurality of entities, and characteristic nodes respectively associated with distinct characteristic

404

408 — the edges connect the entity nodes to the characteristic nodes according to the characteristic data 410 — transforming, via the processor executing a node to-vector algorithm, the characteristic graph to a vector representation 412 — receiving, at the computer system, a similarity request regarding a first entity in the plurality of entities 414 — calculating, via the processor using the vector representation based on the similarity request, similarity scores between the first entity and remaining entities in the plurality of entities 416 — replying, via the computer system, with a list of highest ranked entities within the remaining entities based on the similarity scores

END

FIG. 4

SYSTEM AND METHOD FOR USING GRAPH THEORY TO RANK CHARACTERISTICS

BACKGROUND

1. Technical Field

The present disclosure relates to using graph theory to rank characteristics of an entity, and more specifically to using graph theory to rank those characteristics and identify potential replacement entities.

2. Introduction

Graphs can represent many complex systems such as social networks, protein-protein interaction networks, knowledge graphs, citations, the Internet, etc. In addition, Graph Neural Networks (GNNs) have emerged as an interesting application to a variety of problems applied to non-Euclidean domains like graphs. The ability to leverage such technology in order to provide a variety of recommendations is key for companies to develop products and solutions to customers.

For example, when performed by human beings, tests for similarity between distinct entities are usually answered using anecdotal evidence. Such solutions fail to provide the accuracy needed, instead relying on insufficient data to make a statistically accurate estimation of similarity, and (if performed by a human being) allow for human biases in evaluating the different entities.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: retrieving, at a computer system from a plurality of networked databases, characteristic data representing a plurality of entities; generating, via a processor of the computer system based on the characteristic data, a characteristic graph, the characteristic graph comprising nodes and edges, wherein: the nodes comprise entity nodes respectively associated with an entity in the plurality of entities, and characteristic nodes respectively associated with a distinct characteristic; and the edges connect the entity nodes to the characteristic nodes according to the characteristic data; transforming, via the processor, the nodes of the characteristic graph to a vector representation; receiving, at the computer system, a similarity request regarding a first entity in the plurality of entities; calculating, via the processor using the vector representation based on the similarity request, similarity scores between the first entity and remaining entities in the plurality of entities; and providing, via the computer system, a list of highest ranked entities within the remaining entities based on the similarity scores.

A system configured to perform the concepts disclosed herein can include: at least one processor; and a non-transitory computer-readable storage medium having instructions stored which, when executed by the processor, cause the at least one processor to perform operations comprising: retrieving, from a plurality of networked databases, characteristic data representing a plurality of entities; generating, based on the characteristic data, a characteristic graph, the characteristic graph comprising nodes and edges, wherein: the nodes comprise entity nodes respectively associated with an entity in the plurality of entities, and characteristic nodes respectively associated with a distinct characteristic; and the edges connect the entity nodes to the characteristic nodes according to the characteristic data; transforming the nodes of the characteristic graph to a vector representation; receiving, at the computer system, a similarity request regarding a first entity in the plurality of entities; calculating, using the vector representation based on the similarity request, similarity scores between the first entity and remaining entities in the plurality of entities; and providing a list of highest ranked entities within the remaining entities based on the similarity scores.

A non-transitory computer-readable storage medium configured as disclosed herein can have instructions stored which, when executed by a computing device, cause the computing device to perform operations which include: retrieving, from a plurality of networked databases, characteristic data representing a plurality of entities; generating, based on the characteristic data, a characteristic graph, the characteristic graph comprising nodes and edges, wherein: the nodes comprise entity nodes respectively associated with an entity in the plurality of entities, and characteristic nodes respectively associated with a distinct characteristic; and the edges connect the entity nodes to the characteristic nodes according to the characteristic data; transforming the nodes of the characteristic graph to a vector representation; receiving a similarity request regarding a first entity in the plurality of entities; calculating, using the vector representation based on the similarity request, similarity scores between the first entity and remaining entities in the plurality of entities; providing a list of highest ranked entities within the remaining entities based on the similarity scores.

BRIEF DESCRIPTION OF THE DRAWINGS

FIG. 1 illustrates an example competency chart;

FIG. 2 illustrates an example competency graph;

FIG. 4 illustrates an example method embodiment; and

DETAILED DESCRIPTION

Figure 3:
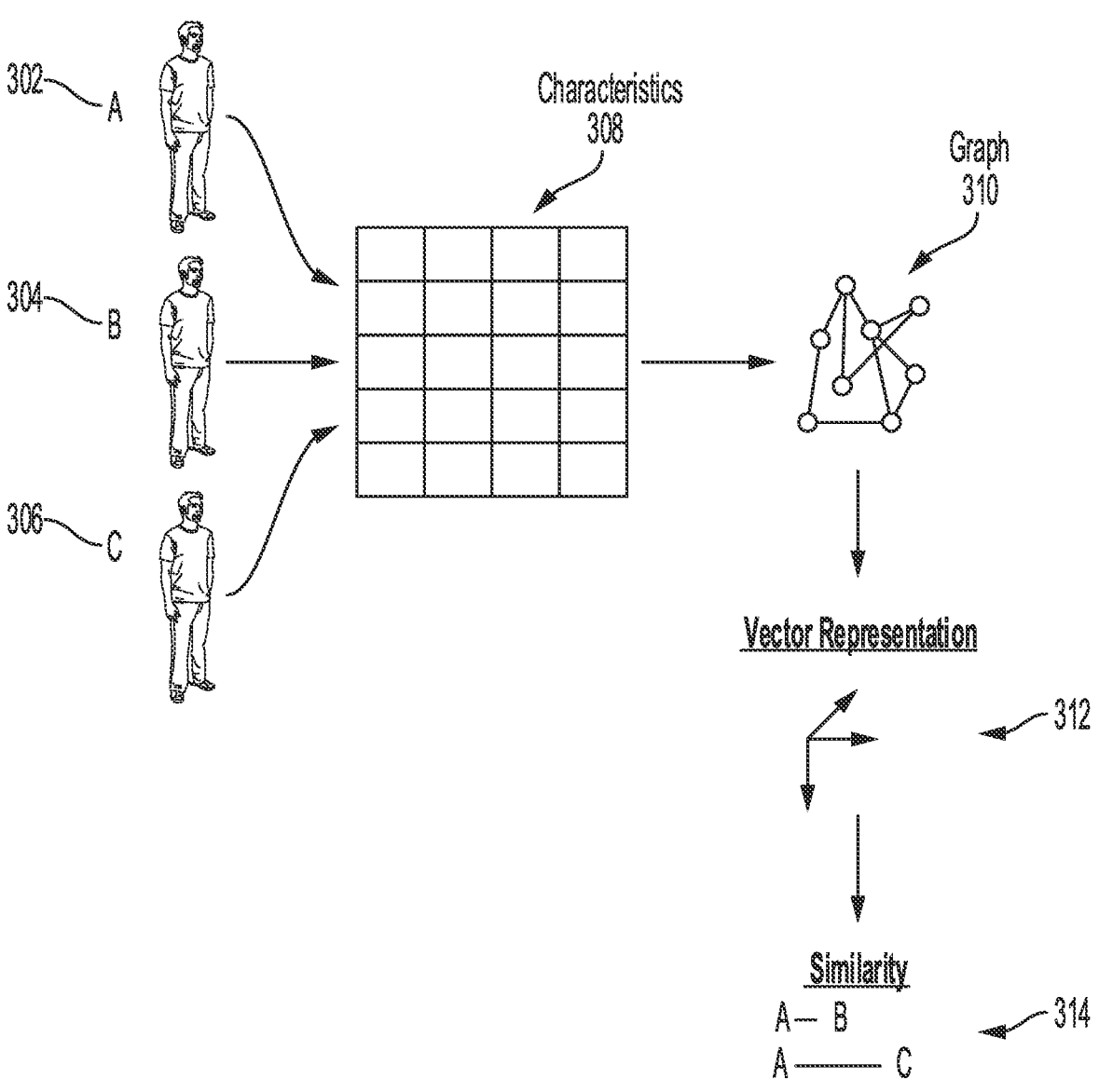
FIG. 3 illustrates an example of transforming entity characteristics into a graph, then into a vector representation.

Various embodiments of the disclosure are described in detail below. While specific implementations are described, it should be understood that this is done for illustration purposes only. Other components and configurations may be used without parting from the spirit and scope of the disclosure.

Systems, method, and computer-readable storage media configured as disclosed herein can build knowledge graphs which map the aspects of entities, then transform the graphs into vectors for a similarity comparison. While many of the examples provided herein concern identifying skills and competencies of individuals, then comparing the resulting skill graphs of those individuals to the graphs of others, the concepts and principles disclosed herein can be applied to graph characteristics of any entity, and can the use of graph analytics can be used to compare the first entity to other entities.

For example, John is a programmer within a company, but has taken a job elsewhere, such that the company needs to replace John. How can the company accurately determine if a potential replacement for John would have the skills needed to fill his role?

First, a system configured as disclosed herein can retrieve data about the individual. These data can be fetched from several different data sources. In John's case, as a coder he may have stored his code segments in an internal bitbucket repository. For instance, if John commits several code snippets in Python and C#, we can infer these programming languages as skills which John possesses. To analyze the strength of the now-identified skills, the system can, for example, look at the total number of Python (and/or C#) snippets stored, and increase the relative skill level based on the number of snippets stored for each respective skill (that is, the number of Python segments for the Python skill, the number of C# segments for the C# skill, or the total number of all coding language segments for an overall coding skill). Another way of determining the strength of the skill level may be the number of times a stored piece of code has been used, referenced, and/or reviewed by others within the organization.

This same principle can apply to skills other than coding. For example, if John were in marketing, a potential skill could be graphic design. The strength of that skill could be based on the number of times John's designs were used, the money invested in an associated advertising campaign, the results of that advertising campaign, and/or the number of references to the design. If John were an author, how often (and by which resources) has his work been cited, how has the writing affected the company's income, how often does John write, etc.

The system can also make use of social media databases (such as LINKEDIN, FACEBOOK, TWITTER, etc.) to determine skills and competency levels for those identified skills. For example, if "Sally" often posted tweets regarding a particular subject, the system can use natural language processing to analyze the tweets, extract the subject of those tweets, and determine that Sally has skills in that area. The system can also recognize the number of re-tweets, responses, etc. to Sally's posts and determine a level of competency in the extracted skill area based on the interactions of others with the tweets.

In some configurations, the competency in a given skill area can be based on different mediums. Using the examples above, if a user has segments of code stored in a common code database, and the user also utilizes social media, the system can combine those factors together in determining the competency level for a given skill.

In some cases, the competency level can be normalized based on other users in that area. For example, if the most capable individual in a given skill area (either within an entity such as a company, organization, or in the entire world) has a skill level of "10," the system can look at the posts, contributions, and/or other factors which resulted in the "10" ranking, then rank a given user based on the comparison. In one such configuration, if the top user had a skill of 10 based on 1000 contributions, the system could give an additional skill point for every 100 contribution of another, such that the skill level is linear based on the number of contributions of a user (with respect to the top user's contributions). Alternatively, the system could be non-linear, such that the ranking requires ever increasing amounts of contributions for additional skill points (e.g., up to 10 contributions=level 1, up to 30 contributions (20 more)=level 2, up to 60 (30 more)=level 3, etc.). Examples of ways in which skill points can be assigned include linear increases (where each point is associated with an equal number of contributions as a lower level), or non-linear increases (such as the required contributions doubling with each level), or any other needed configuration.

With the information regarding the skills of individuals, the system can create a graph illustrating the skills. The graph can be created using an Extract, Transform, and Load algorithm from data sources. This process can be executed periodically, for example daily or weekly. In some configurations, the individuals and the associated characteristics of those entities can each form multiple nodes (one node per entity/characteristic). The edges connecting those nodes can, for example, indicate the relative strength of the entity with regard to a given characteristic in the form of a weighted edge. In some configurations the weighted edges can form a Convolutional Neural Network (CNN), which can provide another feature for the convolutional layers of the neural network.

With the graph built, the system can transform the graph into a vector space with lower dimensions. If, for example, a given graph has five characteristics, or dimensions for the entities described therein, the system can reduce the number of dimensions by describing the graph for a given entity as a vector in vector space. Graph embedding is an approach that is used to transform nodes, edges, and their features into vector space (a lower dimension) whilst maximally preserving properties like graph structure and information. Graphs are tricky because they can vary in terms of their scale, specificity, and subject. For example, the system may execute a Node2Vec algorithm, or a similar algorithm, to transform the graph into vector space with a lower dimension count. For example, the vectors could take the form [1.23, 3.32, 4.12, −1.32, . . . ], where the each number in the vector space represents a respective dimension. Node2vec is one of the first deep learning attempts to learn from graph-structured data. It is an algorithmic framework for representational learning on graphs. Given any graph, it can learn continuous feature representations for the nodes, which can then be used for various downstream machine learning tasks. Learning useful representations from highly structured objects such as graphs is useful for a variety of machine learning applications. Besides reducing the engineering effort, these representations can lead to greater predictive power.

The Node2vec framework learns low-dimensional representations for nodes in a graph by optimizing a neighborhood preserving objective. The objective is flexible, and the algorithm accommodates various definitions of network neighborhoods by simulating biased random walks. Specifically, it provides a way of balancing the exploration-exploitation tradeoff that in turn leads to representations obeying a spectrum of equivalences from homophily to structural equivalence. After applying the Node2vec algorithm, the system can have a metric score, meaning how similar one entity is from another based on their features. With that, the system can leverage the information to recommend an entity replacement with the other entities which are most similar to the entity being analyzed, and help the project managers to better understand their teams. Likewise, the similarity information can help better allocate resources in order to fill the gap of any sub-entity who eventually within a higher level entity.

Using the resulting vectors, the system can generate calculate similarity scores between any two given entities. While any similarity score can be used, one example of a similarity calculation is calculating the cosine similarity using the vectors to calculate the distance between each vector. By using a vector representation of multi-dimensional factors, the system can increase the speed and accuracy of comparisons between respective entities.

Based on the resulting similarity scores, the system can make a recommendation. For example, if the entities being compared are individuals, the system can make a recommendation regarding a possible replacement if a given individual needs to be replaced. However, in addition to using the disclosed system to identify possible replacements, the system can also be used to identify areas in which a given entity may be weak (and need improvement), strong, etc. If, for example, the characteristics of an entire company are being evaluated, using aggregated data based on the individual employees of the company to form the initial company characteristics graph. The resulting graph, when reduced to vector representation and compared to similar companies, may show that the company is comparatively weak with respect to advertising (or some other aspect of the company). Using that information, the system can make a recommendation to hire someone in advertising. Depending on the configuration, the system may be able to search social media websites (LINKEDIN, TWITTER, etc.) and identify individuals which would help correct the company deficiencies identified.

In the same manner, companies can use the concepts disclosed herein to quantify and measure diversity characteristics within an organization. Such a configuration would consent of the individuals to provide the underlying demographic data, such as: age, sex, gender, sexual orientation, race, level of education, place of education, language proficiencies, current residence, residence where the individual was raised, socio-economic status of parents while the individual was being raised, etc. Based on that data, the system can build graphs for the individuals in the organization, then convert the graphs to vector space and compare the resulting vectors. The ultimate comparison can identify areas in which the organization is meeting diversity goals and areas in which it can improve. Recommendations for those identified aspects can then be forwarded to individuals within the company to help further those initiatives.

FIG. 1 illustrates an example competency chart. As illustrated, the chart has characteristics associated with a number of individuals 102. Each of these individuals 102 has assigned a competency 104, such as presentation, article writer, communication, problem solving, which describes a key role within the organization. In other configurations, the competency 104 column could be replaced with a job title, job description, key duties, etc. The competency chart also contains skills 106 for the respective individuals 102. As described above, these skills can be scrapped from social media websites, the Internet, resumes, and/or other resources available to the system. As illustrated, the skills 106 do not have values or levels indicating competency, but such values or levels can be included in other configurations. In addition, in some configurations the skills 106 can be ranked in order of a level of proficiency, such that the first skill ("Skill_1") would be the individual's 102 top skill, and the third skill ("Skill_3") would be the individuals third best skill. It is noted that the illustration of three skills is only an example—the number of identified and/or ranked skills can vary according to the specific needs of a system configuration.

FIG. 2 illustrates an example competency graph 200. In this exemplary graph 200, the competency chart illustrated in FIG. 1 is converted into a graph, with the respective individuals 102, competencies 104, and skills 106 respectively forming nodes, with edges connecting the individuals 102 to the competencies 104 and skills 106.

FIG. 3 illustrates an example of transforming entity characteristics 308 of individuals 302, 304, 306 into a graph 310, then into a vector representation 312. Using the vector representation 312, the system can then identify levels of similarity between individuals 314 (e.g., how similar is A 302 to B 304, or how similar is A 302 to C 306. The graph can, for example, be constructed used a Node2Vec algorithm or similar algorithm, which can learn continuous feature representations for the nodes, which can then be used for various downstream machine learning tasks.

FIG. 4 illustrates an example method embodiment. As illustrated, a system configured as disclosed herein can retrieve, at a computer system from a plurality of networked databases, characteristic data representing a plurality of entities (402) and generate, via a processor of the computer system based on the characteristic data, a characteristic graph, the characteristic graph comprising nodes and edges, wherein: the nodes comprise entity nodes respectively associated with an entity in the plurality of entities, and characteristic nodes respectively associated with a distinct characteristic (406) and the edges connect the entity nodes to the characteristic nodes according to the characteristic data (408). The system can then transform, via the processor, the nodes of the characteristic graph to a vector representation (410) and receive, at the computer system, a similarity request regarding a first entity in the plurality of entities (412). The system can calculate, via the processor using the vector representation based on the similarity request, similarity scores between the first entity and remaining entities in the plurality of entities (414) and reply/provide, via the computer system, a list of highest ranked entities within the remaining entities based on the similarity scores (416).

In some configurations, examples of the plurality of networked databases comprise at least one of LINKEDIN, GITHUB, and BITBUCKET. Social media websites, such as FACEBOOK, TWITTER, etc., can also be used to retrieve data about the individuals.

In some configurations, the illustrated method can further include: weighting the edges according to a skill level of the entity associated with a connected entity node in a skill area associated with a connected skill node, resulting in weighted edges, wherein the similarity scores are further based on a similarity between the weighted edges of the first entity and the remaining entities. In such configurations, the skill level associated with each weighted edge in the weighted edges is determined based on a total number of mentions for the skill area within the characteristic data.

In some configurations, the vector representation has reduced dimensions compared to the characteristic graph.

In some configurations, the plurality of entities are individuals within a company, where the first entity is an individual leaving the company and the characteristic data comprise skills of the individuals.

In some configurations, the similarity request identifies first competencies of the first entity which are desired, and remaining competencies of the first entity, and the similarity scores between the first entity and the remaining entities are based on the first competencies and not based on the remaining competencies.

Figure 5:
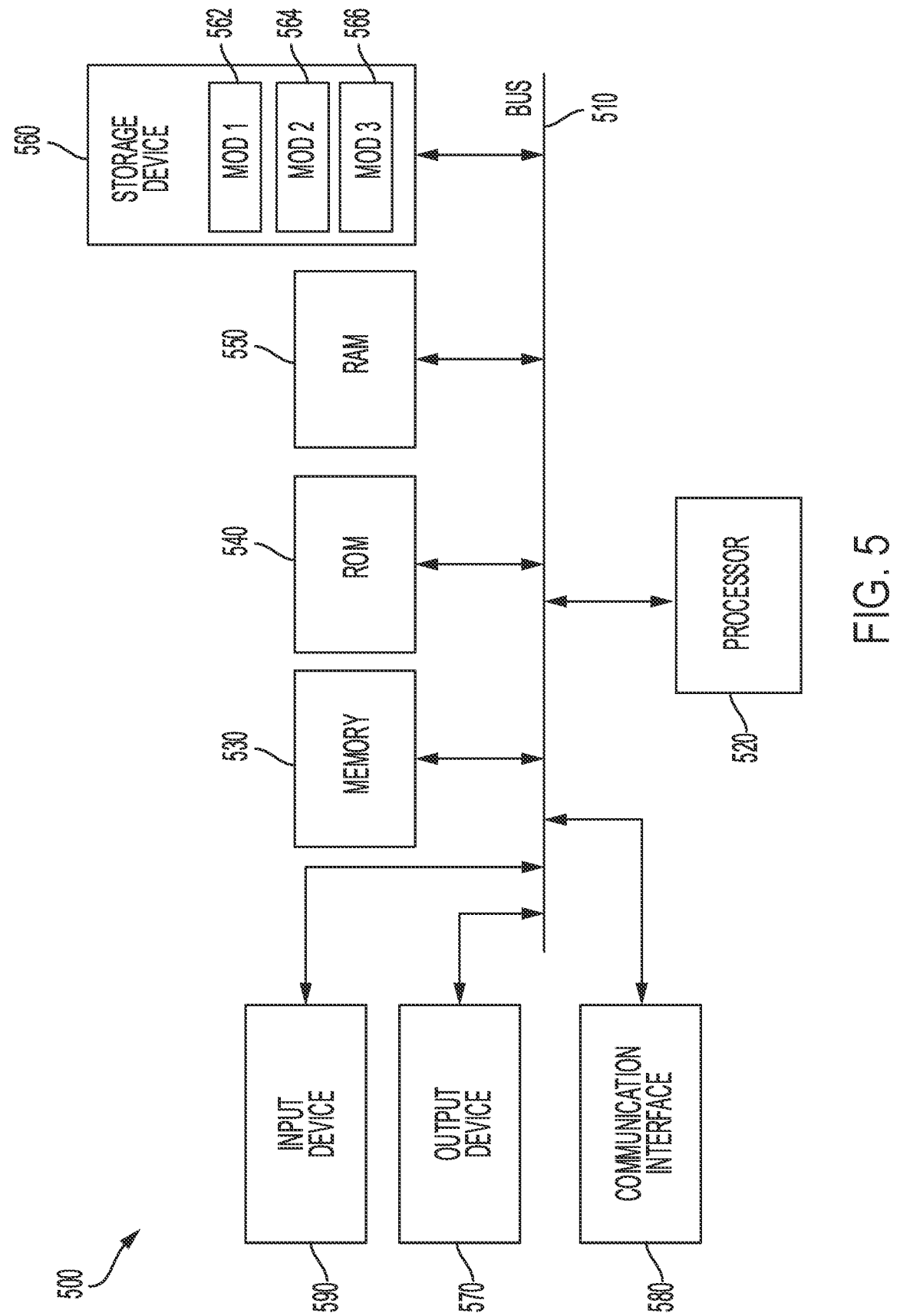
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:

accessing, by one or more processors, coupled with memory, a characteristic graph constructed based on generating a plurality of entity nodes representing a plurality of entities and a plurality of edges connecting the plurality of entity nodes to a plurality of characteristic nodes, the plurality of edges indicating a relative strength of the plurality of entities with regard to a plurality of characteristics represented by the plurality of characteristic nodes;

executing, by the one or more processors, a graph transformation operation on the characteristic graph by (i) identifying entity nodes of the characteristic graph corresponding to a first entity and one or more additional entities of the plurality of entities, (ii) accessing related nodes connected with the entity nodes by associated edges of the plurality of edges, and (iii) transforming the entity nodes, the related nodes, and the associated edges into vector representations indicating the relative strength of the first entity and the one or more additional entities with regard to at least a portion of the plurality of characteristics; and selecting, by the one or more processors, a second entity of the one or more additional entities as a replacement for the first entity within an organizational structure comprising at least a subset of the plurality of entities represented by the plurality of entity nodes of the characteristic graph, the second entity selected as the replacement based on a ranked output of a vector-based comparison using the vector representations generated from the graph transformation operation.

2. The method of claim 1, wherein the characteristic graph is constructed based on characteristic data retrieved from a plurality of networked databases, the plurality of networked databases comprising at least one of a social media network or repository.

3. The method of claim 1, further comprising:

identifying, by the one or more processors, a weighting of one or more of the plurality of edges according to a skill level of an entity associated with a connected entity node in a skill area associated with a connected skill node; and determining, by the one or more processors, a similarity between the first entity and the one or more additional entities based on the weighting.

4. The method of claim 3, wherein the skill level is determined based on one or more interactions associated with characteristic data of the plurality of entities for the skill area.

5. The method of claim 1, wherein generating the vector representations comprises executing a dimensional transformation on the characteristic graph.

6. The method of claim 1, wherein:

the plurality of entities comprise individuals of the organizational structure;

the first entity comprises an individual leaving the organizational structure; and the second entity is provided as the replacement for the first entity.

7. The method of claim 1, further comprising:

receiving, by the one or more processors, a request to determine a similarity between the first entity and the plurality of entities, the plurality of entities associated with at least one of an individual or an organization, wherein the request identifies a role of the first entity, the role associated with one or more skills, characteristics, or competencies of the first entity; and wherein providing the second entity comprises determining one or more similarities between the one or more skills, characteristics, or competencies based on the vector-based comparison.

8. A system comprising:

one or more processors, coupled with memory, to:

access a characteristic graph constructed based on generating a plurality of entity nodes representing a plurality of entities and a plurality of edges connecting the plurality of entity nodes to a plurality of characteristic nodes, the plurality of edges indicating a relative strength of the plurality of entities with regard to a plurality of characteristics represented by the plurality of characteristic nodes;

execute a graph transformation operation on the characteristic graph by (i) identifying entity nodes of the characteristic graph corresponding to a first entity and one or more additional entities of the plurality of entities, (ii) accessing related nodes connected with the entity nodes by associated edges of the plurality of edges, and (iii) transforming the entity nodes, the related nodes, and the associated edges into vector representations indicating the relative strength of the first entity and the one or more additional entities with regard to at least a portion of the plurality of characteristics; and select a second entity of the one or more additional entities as a replacement for the first entity within an organizational structure comprising at least a subset of the plurality of entities represented by the plurality of entity nodes of the characteristic graph, the second entity selected as the replacement based on a ranked output of a vector-based comparison using the vector representations generated from the graph transformation operation.

9. The system of claim 8, wherein the characteristic graph is constructed based on characteristic data retrieved from a plurality of networked databases, the plurality of networked databases comprising at least one of a social media network or repository.

10. The system of claim 8, the one or more processors further to:

identify a weighting of one or more of the plurality of edges according to a skill level of an entity associated with a connected entity node in a skill area associated with a connected skill node; and determine a similarity between the first entity and the one or more additional entities based on the weighting.

11. The system of claim 10, wherein the skill level is determined based on one or more interactions associated with characteristic data of the plurality of entities for the skill area.

12. The system of claim 8, wherein generating the vector representations comprises executing a dimensional transformation on the characteristic graph.

13. The system of claim 8, wherein:

the plurality of entities comprise individuals of the organizational structure;

the first entity comprises an individual leaving the organizational structure; and the second entity is provided as the replacement for the first entity.

14. The system of claim 8, the one or more processors to:

receive a request to determine a similarity between the first entity and the plurality of entities, the plurality of entities associated with at least one of an individual or an organization, wherein the request identifies a role of the first entity, the role associated with one or more skills, characteristics, or competencies of the first entity; and wherein providing the second entity comprises determining one or more similarities between the one or more skills, characteristics, or competencies based on the vector-based comparison.

15. A non-transitory computer-readable storage medium having instructions stored which, when executed by one or more processors, cause the one or more processors to perform operations comprising:

accessing a characteristic graph constructed based on generating a plurality of entity nodes representing a plurality of entities and a plurality of edges connecting the plurality of entity nodes to a plurality of characteristic nodes, the plurality of edges indicating a relative strength of the plurality of entities with regard to a plurality of characteristics represented by the plurality of characteristic nodes;

executing a graph transformation operation on the characteristic graph by (i) identifying entity nodes of the characteristic graph corresponding to a first entity and one or more additional entities of the plurality of entities, (ii) accessing related nodes connected with the entity nodes by associated edges of the plurality of edges, and (iii) transforming the entity nodes, the related nodes, and the associated edges into vector representations indicating the relative strength of the first entity and the one or more additional entities with regard to at least a portion of the plurality of characteristics; and selecting a second entity of the one or more additional entities as a replacement for the first entity within an organizational structure comprising at least a subset of the plurality of entities represented by the plurality of entity nodes of the characteristic graph, the second entity selected as the replacement based on a ranked output of a vector-based comparison using the vector representations generated from the graph transformation operation.

16. The non-transitory computer-readable storage medium of claim 15, wherein the characteristic graph is constructed based on characteristic data retrieved from a plurality of networked databases, the plurality of networked databases comprising at least one of a social media network or repository.

17. The non-transitory computer-readable storage medium of claim 15, wherein the instructions cause the one or more processors to perform operations comprising:

identifying a weighting of one or more of the plurality of edges according to a skill level of an entity associated with a connected entity node in a skill area associated with a connected skill node; and determining a similarity between the first entity and the one or more additional entities based on the weighting.

18. The non-transitory computer-readable storage medium of claim 17, wherein the skill level is determined based on one or more interactions associated with characteristic data of the plurality of entities for the skill area.

19. The non-transitory computer-readable storage medium of claim 15, wherein generating the vector representations comprises executing a dimensional transformation on the characteristic graph.

20. The non-transitory computer-readable storage medium of claim 15, wherein:

the plurality of entities comprise individuals of the organizational structure;

the first entity comprises an individual leaving the organizational structure; and the second entity is provided as the replacement for the first entity.

* * * * *